United States Patent [19]
Theurillat et al.

[11] Patent Number: 5,924,505
[45] Date of Patent: Jul. 20, 1999

[54] DRIVING SYSTEM FOR HYBRID-POWERED MOTOR VEHICLE AND CONTROL METHOD FOR SUCH A SYSTEM

[75] Inventors: Patrick Theurillat, Yverdon-les-Bains; Gianni Francescutto, Bienne; Robert Apter, Yverdon-les-Bains; René Jeanneret, Merzligen; Antoine Toth, Delémont, all of Switzerland

[73] Assignee: SMH Management Services AG, Biel, Switzerland

[21] Appl. No.: 08/778,346

[22] Filed: Jan. 3, 1997

[30] Foreign Application Priority Data

Jan. 5, 1996 [FR] France .................. 96 00094

[51] Int. Cl.$^6$ .................................. B60K 1/00
[52] U.S. Cl. ..................... 180/65.4; 307/10.1; 477/3
[58] Field of Search ................... 180/65.1, 65.2, 180/65.3, 65.4; 307/9.1, 10.1, 10.7; 477/2, 3; 340/441, 466

[56] References Cited

U.S. PATENT DOCUMENTS

| | | | |
|---|---|---|---|
| 4,470,476 | 9/1984 | Hunt | 180/65.2 |
| 5,402,046 | 3/1995 | Jeanneret | 180/65.4 X |
| 5,461,289 | 10/1995 | Adler et al. | 180/65.4 X |

FOREIGN PATENT DOCUMENTS

| | | |
|---|---|---|
| 645 278 | 3/1995 | European Pat. Off. . |
| 678 414 | 10/1995 | European Pat. Off. . |
| 4 344 053 | 7/1994 | Germany . |
| 93 07022 | 4/1993 | WIPO . |
| 94 27837 | 12/1994 | WIPO . |

*Primary Examiner*—Richard M. Camby
*Assistant Examiner*—William R Zimmerli
*Attorney, Agent, or Firm*—Griffin, Butler Whisenhunt & Szipl, LLP

[57] ABSTRACT

The invention concerns a driving system for a hybrid-powered motor vehicle. It includes a generator set producing a direct current used by a driving set with an electric motor for driving at least one driving wheel of the vehicle. Using an accelerator, the driver gives a power set-point signal that is used by a first adjusting device which acts on the thermal engine, the generator, and the AC/DC converter of the generator set. A second adjusting device adjusts the power of the driving set as a slave of the generator set, according to the variations in the voltage of the supply circuit with respect to a desired voltage, without considering the signal from the accelerator.

23 Claims, 4 Drawing Sheets

5,924,505

DRIVING SYSTEM FOR HYBRID-POWERED MOTOR VEHICLE AND CONTROL METHOD FOR SUCH A SYSTEM

FIELD OF THE INVENTION

The present invention concerns a method for controlling a driving system for a hybrid-powered motor vehicle, said system comprising:

a generator set comprising a thermal engine provided with a power adjusting element and electric generator means driven by the thermal engine to produce a direct electric supply current with adjustable power, a driving set supplied by said supply current and provided with at least one electric motor driving at least one driving wheel of the vehicle, and an accelerator actuated by a driver of the vehicle to deliver a first set-point signal.

The invention also concerns a hybrid-powered motor vehicle driving system, in particular for the implementation of the aforementioned method, said system comprising:

a generator set comprising a thermal engine provided with a power adjusting element and electric generator means driven by the thermal engine to produce a direct electric supply current with adjustable power, a driving set supplied by said supply current and provided with at least one electric motor driving at least one driving wheel of the vehicle, an accelerator actuated by a driver of the vehicle to deliver a first set-point signal, and adjusting means arranged for adjusting the power of the electric motor as a function of said first set-point signal.

BACKGROUND OF THE INVENTION

Patent publication WO 93/07022 discloses a driving system of this kind, of the series hybrid type, wherein the generator set comprises a thermal engine, a brushless poly-phased electric generator and an electronic converter which supplies the direct supply current under the monitoring of a voltage regulator. The driving set comprises one or more driving sets each comprising an electronic traction converter and a brushless poly-phased electric motor. An electronic control unit globally adjusts the operation of the system in response to an accelerator pedal, to signals provided by various sensors and with reference to a memory containing a representation of a one or more characteristic fields of the thermal engine. This unit controls the power of the thermal engine via action on the throttle valve, the resistant torque of the generator via action on the supply converter, and the power of the electric motor via action on the traction converter as a function of the position of the accelerator.

An inherent disadvantage of this system lies in the great complexity of the adjusting means, which have to use a high number of sensors of different types, process their signals in conjunction with several desired values and elaborate different adjustment variables which must be coordinated with each other. Such co-ordination is particularly complex in transient states, which are preponderant in motor vehicles. It is even more complex when the generator set comprises an accumulator battery intended to provide a balance of supply current.

Furthermore, the known systems generally necessitate the use of current sensors which are not very precise, which introduces margins of error into the adjustment and often requires additional adjustments in order to assure stability.

There exists therefore a need for a simpler control method, capable of operating with a reduced number of sensors and avoiding as far as possible the use of current sensors.

A relatively simple system, disclosed in publication WO 94/27837, provides two distinct control circuits for the generator set and the driving set, each using a speed signal of the engine or motor of the corresponding set and the set-point signal provided by the accelerator. The coordination of the operating states of the two sets is achieved by a power adjusting circuit placed between the two sets. On the basis of a comparison between a power signal from the thermal engine and the set-point signal from the accelerator, this circuit switches onto the direct current supply circuit either a parallel resistor if it is a question of accelerating, or a series resistor if it is a question of slowing down. The effect of these actions is to modify the resistant torque of the generator, while the thermal engine still rotates at "full throttle". The generator set, which is thus enslaved by the driving set, reacts relatively slowly and this can affect the vehicle performance. Moreover, the electric resistors induce a certain dissipation of energy. Further, the speed of the thermal engine being always high has disadvantages from the point of view of noise, fuel consumption and driving comfort.

SUMMARY OF THE INVENTION

An object of the present invention is to provide a driving system and a control method allowing relatively simple adjusting means to be used, operating with a small number of sensors and with low margins of error, and adaptable to different configurations of the driving system using the same types of adjustment. In particular, the same adjustment principle should be able to be used with or without a battery connected to the supply circuit.

For this purpose, the invention concerns a method of the type indicated hereinabove, characterised in that, in order to control the power of the electric motor, the power of said supply current is adjusted by adjusting the generator set on the basis of the first set-point signal and the speed of the thermal engine, and the driving set is adjusted on the basis of the effective power of the supply current without considering the first set-point signal.

The voltage of said supply current is preferably measured and the power of the driving set is adjusted on the basis of said voltage.

Thus, the principle of the invention provides that the accelerator acts first of all on adjustment of the generator set, which is the set reacting the least fast, whereas the driving set is adjusted autonomously and automatically as a function of a single parameter of its electric supply. This latter adjustment is quasi instantaneous, so that the driving set operates as a slave of the generator set, whose operating state it permanently follows. Since the measured parameter is preferably the supply voltage, this adjustment can easily be precise and stable. In other words, a variation of the supply voltage, indicating an imbalance between the power of the supply current and the power demand from the driving set, is detected and used to regulate the driving set in consequence.

In another aspect, the invention concerns a system of the type indicated hereinabove, characterised in that the adjusting means comprise a first adjusting device, acting on the generator set to adjust the power of said supply current as a function of the first set-point signal, and a second adjusting device acting on the driving set to adjust the power of the electric motor as a function of a parameter of said supply current, this parameter being preferably the voltage.

BRIEF DESCRIPTION OF THE DRAWINGS

Other characteristics and advantages of the invention will appear in the following description of different embodiments, presented by way of example with reference to the attached drawings, in which.

DETAILED DESCRIPTION OF PREFERRED EMBODIMENT

Figure 1:
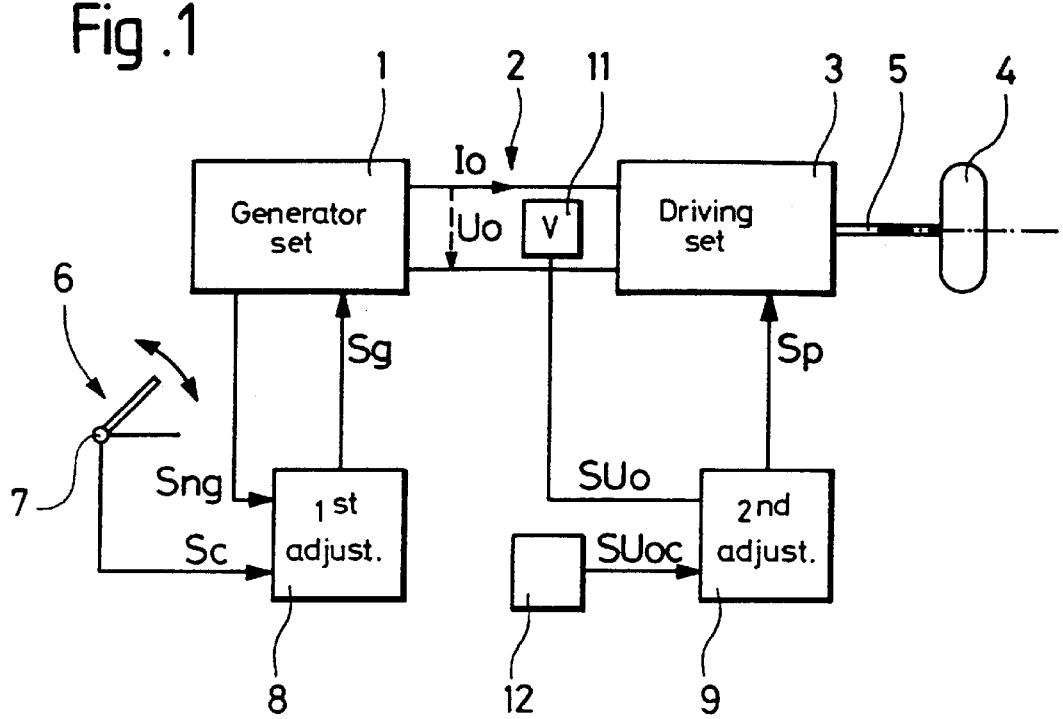
FIG. 1 is a simplified diagram representing a driving system according to the invention in its general preferred form.

Referring to FIG. 1, the driving system shown belongs to the well known type of series hybrid driving systems for motor vehicles. It comprises a generator set 1 provided with a thermal engine and electric generator means supplying a direct electric current $I_O$ at a direct voltage $U_O$ to a bifilar supply circuit 2. This circuit supplies a driving set 3 provided with at least one electric motor which drives at least one driving wheel 4 via a shaft 5 or via any other mechanical transmission means. Of course, the vehicle generally comprises several driving wheels, driven either by a common electric motor, or by individual electric motors which are considered here as belonging to driving set 3. Since these solutions are well known to the man skilled in the art, only one electric motor and only one wheel will be mentioned here in order to simplify the description.

The driver controls the power or the speed of the vehicle by acting on an accelerator 6, for example a pedal associated with a travel sensor 7 which supplies a first set-point signal Sc preferably representing a power and acting on the driving system via adjusting means. In the present invention, these means are divided into a first adjusting device 8, associated with generator set 1, and a second adjusting device 9 associated with driving set 3. As is shown by FIG. 1, first adjusting device 8 receives set-point signal Sc and one or more signals representative of the operating state of the generator set, in particular a signal Sng representing the speed of the thermal engine and the generator driven by this latter. As a function of the signals which it receives, device 8 supplies one or more control signals Sg to generator set 1 to adjust the power of supply current $I_O$ according to the position of accelerator 6, and possibly according to the variation in this position. Device 8 may also take account of other parameters as will be described hereinbelow.

On the other hand, second adjusting device 9 adjusts driving set 3 essentially as a function of the power made available thereto by supply circuit 2. In its preferred form described here, it receives a measurement signal $SU_O$ provided by a voltage sensor 11 and representing the direct effective voltage $U_O$ of supply current $I_O$. This signal may be equal to the voltage itself or to a fraction of this latter, for example. Device 9 receives further a second set-point signal $SU_{Oc}$ representing a reference or desired value $U_{Oc}$ of voltage $U_O$. This signal is provided by an element 12 which may be, for example, a wired circuit incorporated in device 9 or a circuit of another type, forming part of the driving system control means. On the basis of a comparison between the two signals $SU_O$ and $SU_{Oc}$, second adjusting device 9 elaborates at least a second control signal Sp which it supplies to driving set 3 to adjust its power so as to revert supply voltage $U_O$ constantly to the desired value prescribed by second set-point signal $SU_{Oc}$.

Thus the adjustment of driving set 3 by second adjusting device 9 is effected in a very rapid manner, almost instantaneously, while the adjustment of generator set 1 by first adjusting device 8 operates more slowly because of the inertia of this set, in particular the inertia of the rotating masses of the thermal engine and the generator. Driving set 3 is not directly controlled by first set-point signal Sc from accelerator 6, but only via the reaction of generator set 1, corresponding to a variation in direct supply voltage $U_O$. It thus operates as a slave of generator set 1.

In other words, the system operates according to the chain principle: the production of a certain energy with the aid of a thermal engine is controlled, which energy is transformed into a direct electric energy supplied to supply circuit 2 and which is consumed finally in driving set 3 to be transformed into mechanical energy transmitted to each driving wheel 4.

Working in this manner assures the stability of the system, since each element adapts to the element which is situated upstream in the chain and there is no feedback within the system between the output and input of the system. The only condition required for assuring the stability of the system and an optimum operation in all cases is that, the further one advances in the chain, the more rapid the reaction time of the system elements must be. This is the case in the system described hereinabove, where these conditions may easily be achieved, since the slowest element in the system is the thermal engine. As regards the other elements, they have reaction times which are variable via electronic means with the aid of their respective adjusting devices.

Moreover, such a system can be achieved with a small number of sensors and, if required, without using current sensors, so that it avoids the aforementioned disadvantages.

Figure 2:
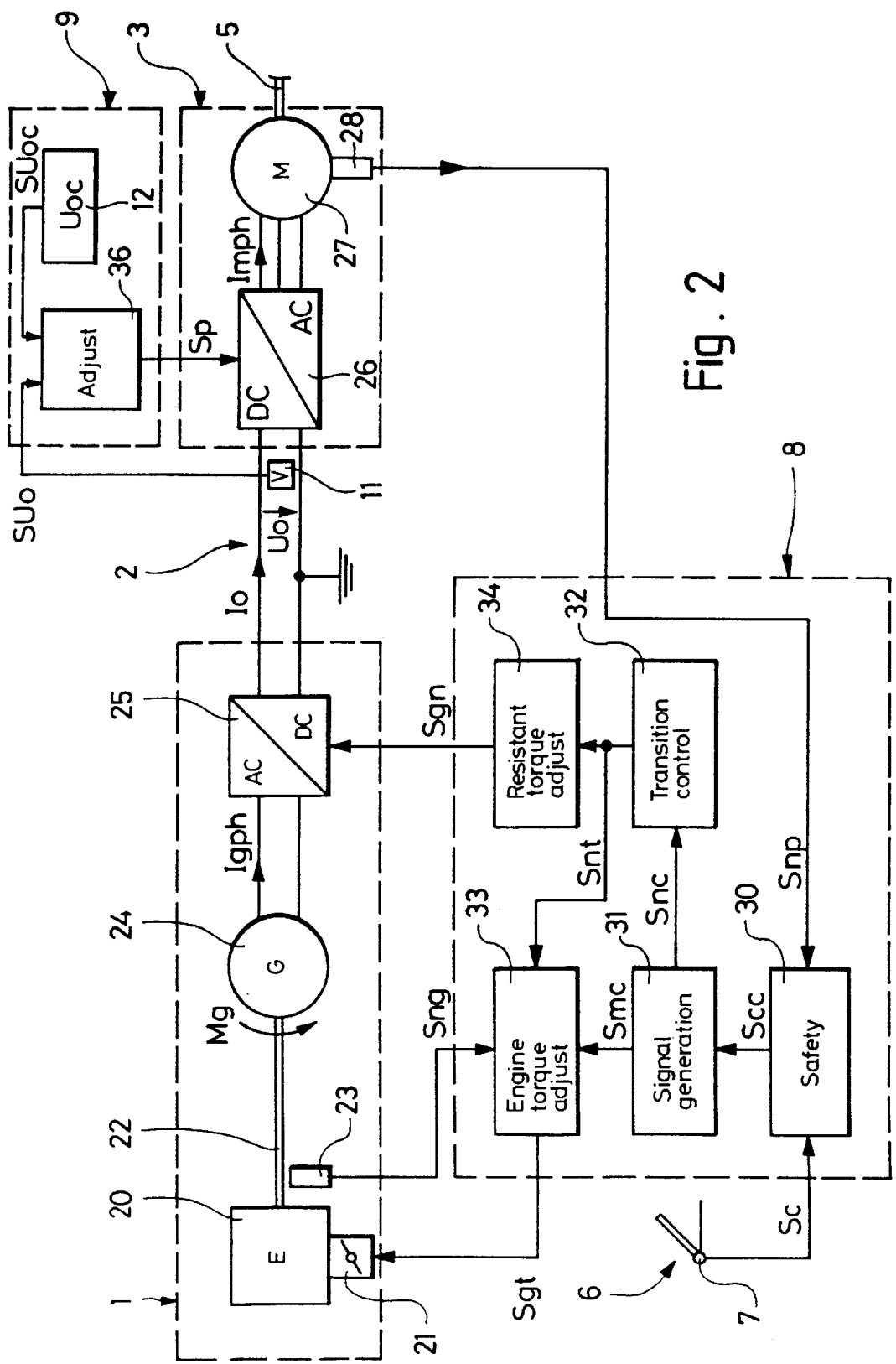
FIG. 2 shows schematically a first particular embodiment of the invention.

FIG. 2 shows in more detail a preferred embodiment of a driving system according to FIG. 1.

Generator set 1 comprises an adjustable thermal engine 20 of any type, for example, an Otto engine provided with a power adjusting element 21 such as a throttle valve or an injection device. Engine 20 may also be of the diesel, gas turbine or other type. The output shaft 22 of the engine is associated with a speed sensor 23 delivering signal Sng and drives an electric generator 24, preferably of the asynchronous or brushless type, which supplies an alternating current IGph to an electronic supply converter 25. The latter converts the alternating current (AC) into a direct supply current (DC) of voltage Uo to supply circuit 2. In driving set 3, this current supplies an electronic traction converter 26 which operates as an inverter to deliver a three-phase alternating traction current of intensity Imph to one or more electric motors 27 whose shaft 5 drives the corresponding driving wheel. This structure is similar to that described in patent publication WO 93/07022, except that in the present case, if there are several electric motors 27, it is preferable to supply them all by means of the same traction converter 26 controlled by second adjusting device 9. Motor 27 is provided with a speed sensor 28 delivering the second speed signal Snp.

First adjusting device 8 preferably comprises a safety unit 30 which receives first desired signal Sc and reduces it if necessary as a function of the admissible power of driving set 3, to deliver a corrected set-point signal Scc. In a known manner, the purpose of this correction is to limit the electric supply power when electric motor 27 rotates relatively slowly, in order to avoid excessive amperages in the driving set. For this purpose, unit 30 uses here second speed signal Snp, because this latter is easy to obtain, but it could act differently, in particular on the basis of the frequency produced by converter 26 or directly with the aid of a predetermined function of signal Sc. A signal generating unit 31 receives corrected set-point signal Scc and delivers, for example by using a stored table of values or a fuzzy logic device, a pair of intermediate signals Smc and Snc determining the optimum stationary values to be reached for example by the torque and speed of rotation of the generator set formed of thermal engine 20 and generator 24.

Signal Snc is processed by a transition control unit 32 which applies a power variation law as a function of time, to pass in optimum conditions from the former stationary operating state to the new desired stationary state defined by accelerator 6. Said optimum conditions may concern for example the speed increase rapidity of the thermal engine, its specific consumption, its polluting emissions etc., such parameters being able to be provide by a representation of the characteristic field of the engine, for example in a stored table, or by a fuzzy logic device. Unit 32 thus delivers a signal Snt which is a transient speed instruction from generator set 1.

Signal Snt is transmitted to an engine torque adjusting unit 33, which also receives signals Smc and Sng and delivers a first control signal Sgt which determines the instantaneous position of control element 21 of engine 20. Signal Snt is also received by a resistant torque adjusting unit 34 which elaborates a second control signal Sgn acting on supply converter 25 so as to adjust alternating current Igph, which determines resistant torque Mg exerted by generator 24 on engine 20. Output voltage $U_O$ of converter 25 is approximately constant, but it may fluctuate downwards or upwards if driving set 3 consumes too much or too little electric power, in particular in a transient phase.

Second adjusting device 9 corresponds with that which was described with reference to FIG. 1. In the event of a difference between the effective value of supply voltage $U_O$ and desired voltage $U_{Oc}$, an adjusting unit 36 which compares signals $SU_O$ and $SU_{Oc}$ delivers control signal Sp acting in a known manner on traction converter 26, for example to modify the voltage and/or frequency of the alternating current supplied to electric motor 27. This action very rapidly brings voltage $U_O$ to desired voltage $U_{Oc}$, independently of the speed of motor 27 and of the vehicle itself.

It will also be noted that the system operates without any current sensors, which avoids the aforementioned problems of imprecision and instability.

Figure 3:
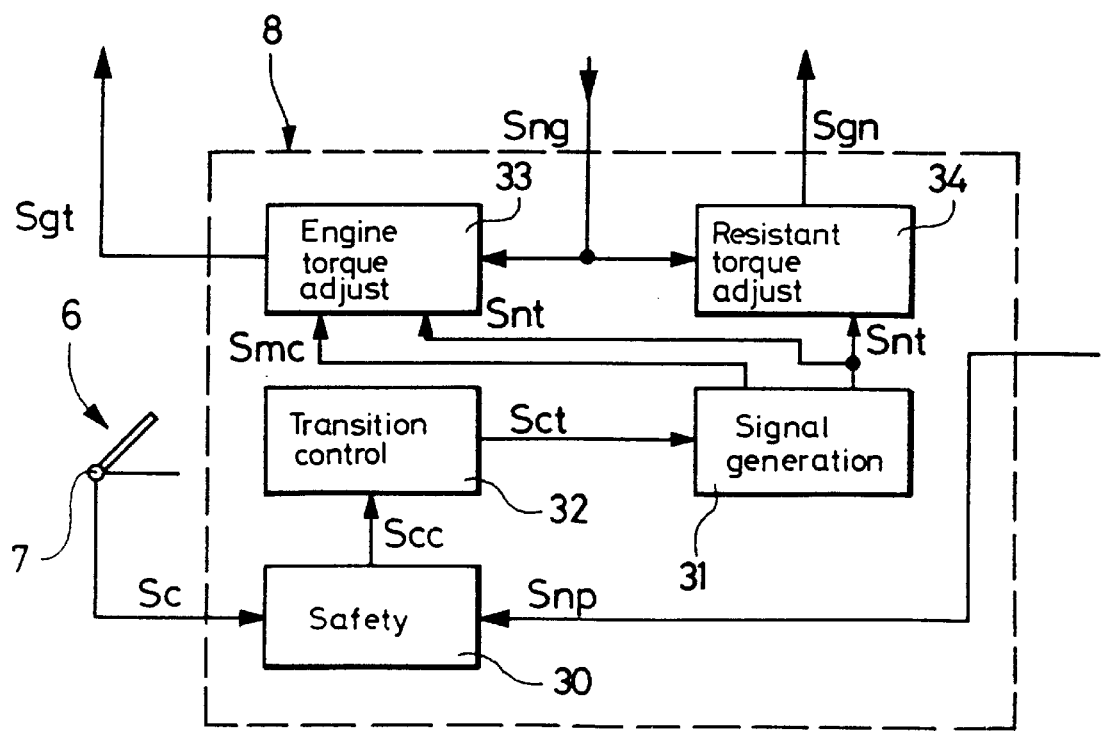
FIG. 3 shows an alternative embodiment of an element of FIG. 2.

FIG. 3 illustrates an alternative embodiment of first adjusting device 8, wherein the positions of units 31 and 32 are permuted with respect to FIG. 2. Unit 32 receives corrected set-point signal Scc and delivers a transient set-point signal Sct to unit 31, which generates signals Smc and Snt representing the optimum transient values of the torque and speed of rotation of engine 20. Furthermore, unit 34 also receives generator set measured speed signal Sng. It will be noted that this alternative may also be used in the following examples.

Figure 4:
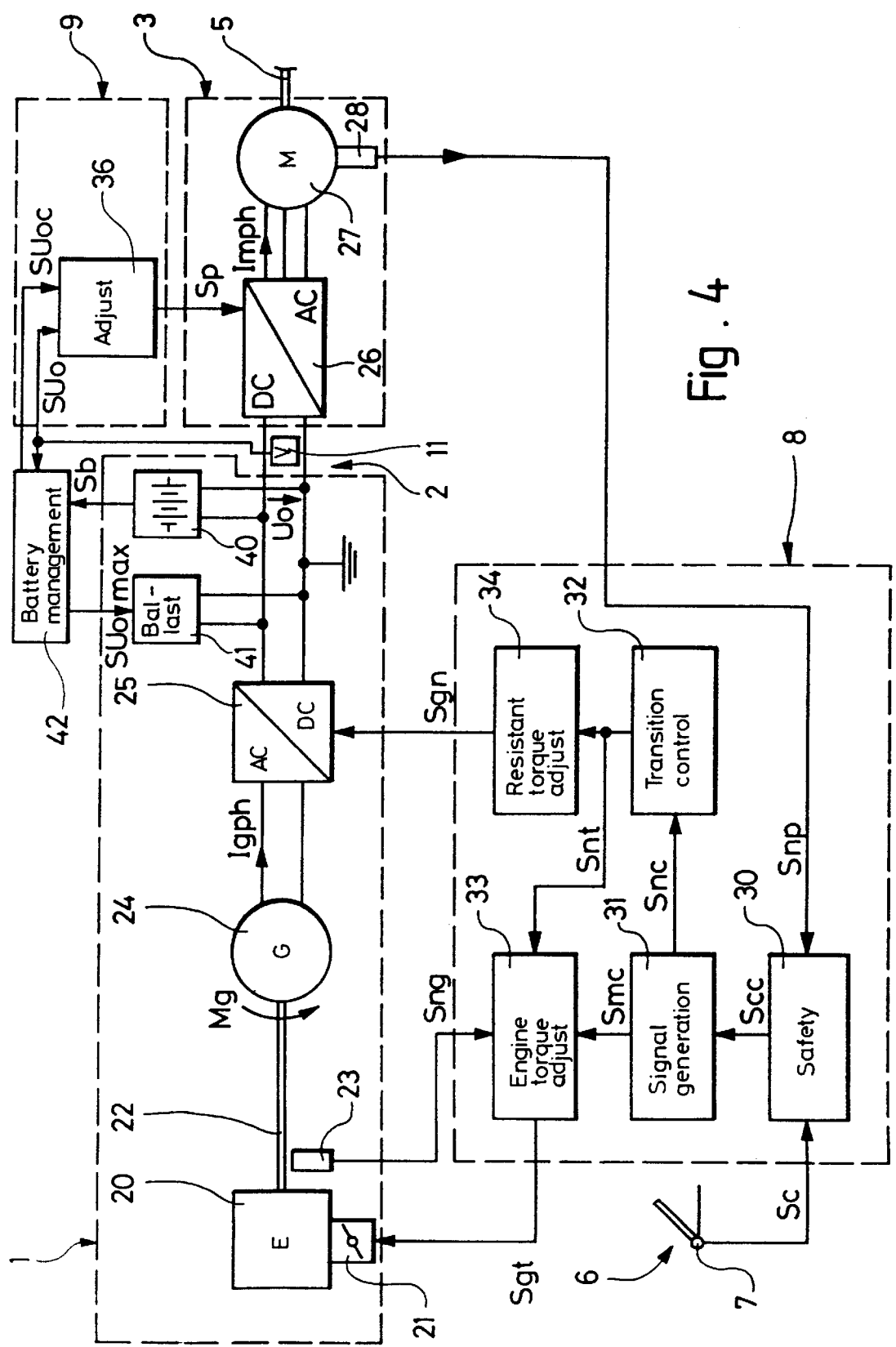
FIG. 4 shows a second particular embodiment of the invention.

In the embodiment of the driving system according to FIG. 4, practically all the elements shown in FIG. 2 are seen again, bearing the same references. The essential difference lies in the addition of an electric accumulator battery 40, capable of providing a top-up current to supply circuit 2 and of recharging itself by absorbing, as required, a part of the current produced by supply converter 25 or of the current produced by electric regenerative braking by means of electric motor 27. In the event that such braking is foreseen, ballast means 41, intended to use the current that battery 40 cannot absorb, may also be connected to the supply circuit. In a known manner, such ballast means may comprise, for example, resistors dissipating energy in the form of heat, or a kinetic or thermal energy accumulator. Battery 40 and ballast means 41 are under the control of an electronic management unit 42 which determines the state of charge of battery 40 on the basis of one or more signals Sb and switches on ballast means 41 by means of a signal $SU_{Omax}$ when supply voltage $U_O$ exceeds a threshold value which depends on the state of charge of battery 40. It is also management unit 42 which delivers desired voltage signal $SU_{Oc}$ to adjusting device 9 of driving set 3. Given that the open circuit voltage at the terminals of battery 40 depends on its state of charge, supply voltage $U_O$ also varies with this state of charge, and management unit 42 must also take account thereof consequently to elaborate desired signal $SU_{Oc}$.

The man skilled in the art will understand that management unit 42 may also receive different measurement or desired signals, in order to manage battery 40 in an optimum manner as a function of the operating states of the system and the commands given by the driver.

Figure 5:
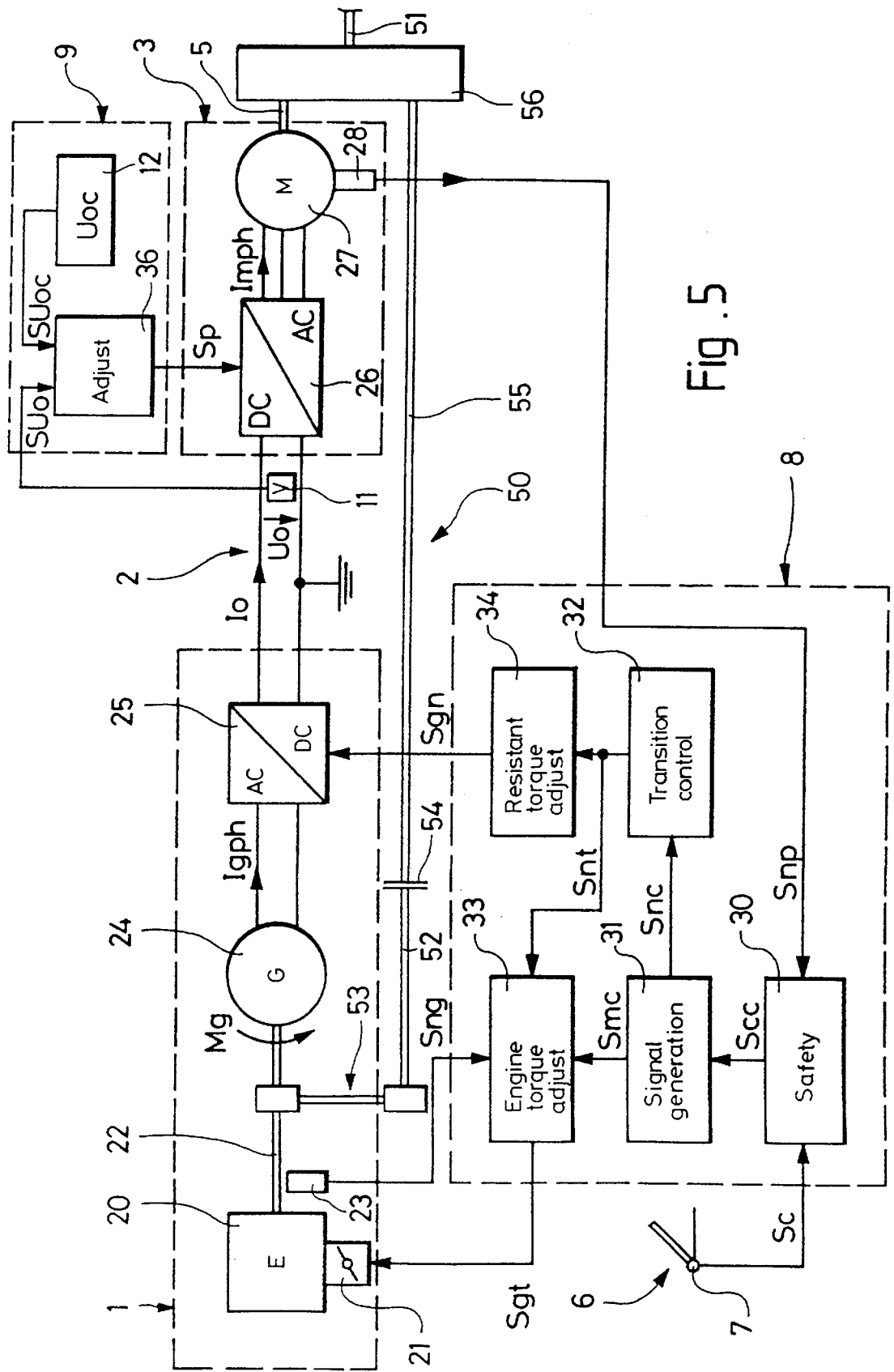
FIG. 5 shows a third particular embodiment of the invention.

The applications of the present invention are not limited to a hybrid-powered vehicle of the series type. By way of example, FIG. 5 shows a driving system of the mixed type (series and parallel) where there exist, in parallel with by the electric driving line via motor 27 in conformity with FIG. 2, a purely mechanical driving line 50 between thermal engine 20 and a transmission shaft 51 driving the driving wheels in a known manner, for example via a differential which is not shown. Line 50 comprise a first secondary shaft 52 coupled to driving shaft 22 by any transmission means 53, a clutch 54, a second secondary shaft 55 and a transmission box 56 which connects the two shafts 5 and 55 to shaft 51. It is possible to control the distribution of power between the two lines by intervening solely in first adjusting device 8, in particular in unit 34 adjusting the resistant torque of generator 24. Of course, such a mechanical line may also be added to the tem illustrated in FIG. 4.

Although the examples illustrated in FIGS. 2 to 5 comprise alternating current electric machines 24 and 27 coupled to respective converters 25 and 26, the principle of the present invention is applicable with other types of electric machines, in particular direct current machines, either in generator set 1 or in driving set 3. In such case, adjustment by means of control signal Sgn or Sp may act in a known manner on the excitation current of the electric machine.

What is claimed is:

1. A method for controlling a driving system for a hybrid-powered motor vehicle, said system comprising a generator set comprising a thermal engine provided with a power adjusting element and electric generator means driven by the thermal engine to produce a DC supply current with adjustable power, a driving set supplied by said DC supply current and provided with at least one electric motor driving at least one driving wheel of the vehicle, and an accelerator actuated by a driver of the vehicle, said method comprising the steps of:

(a) producing a first set-point signal as a function of actuation of the accelerator;
   (b) measuring a speed of the thermal engine;

(c) adjusting the power of said DC supply current by regulating the generator set as a function of the first set-point signal and the speed of the thermal engine;

(d) continuously measuring a voltage of said DC supply current; and (e) continuously regulating the power of the driving set as a function of the measured value of said voltage without considering said first set-point signal.

2. A method according to claim 1, wherein in step (e) said regulation is made on the basis of a comparison between said measured value and a desired value of said voltage.

3. A driving system for a hybrid-powered motor vehicle, said system comprising a generator set comprising a thermal engine provided with a power adjusting element and electric generator means driven by the thermal engine to produce a DC supply current with adjustable power, a driving set supplied by said DC supply current and provided with at least one electric motor driving at least one driving wheel of the vehicle, an accelerator actuated by a driver of the vehicle to deliver a first set-point signal, and adjusting means arranged for adjusting the power of said at least one electric motor as a function of said first set-point signal, wherein the adjusting means comprises a first adjusting device, acting on the generator set to adjust the power of said DC supply current as a function of the first set-point signal, and a second adjusting device which is separate from the first adjusting device, said second adjusting device acting on the driving set to adjust the power of the electric motor as a function of a parameter of said DC supply current.

4. A driving system according to claim 3, wherein said parameter is a voltage, the second adjusting device comprising a voltage sensor which delivers a measurement signal representative of the voltage of said DC supply current.

5. A driving system according to claim 4, wherein the driving set comprises an electric traction converter which receives said DC supply current and supplies said at least one electric motor, and wherein the second adjusting device comprises an adjusting unit which receives the measurement signal and delivers a control signal to the traction converter as a function of the measurement signal.

6. A driving system according to claim 5, wherein said adjusting unit further receives a second set-point signal representative of a reference voltage and delivers said control signal as a function of a comparison between the measurement signal and the second set-point signal.

7. A driving system according to claim 6, wherein the second set-point signal has a predetermined fixed value.

8. A driving system according to claim 6, wherein the generator set comprises an electric accumulator and wherein the adjusting means comprise means for determining the second set-point signal as a function of a state of charge of said accumulator.

9. A driving system according to claim 3, wherein the electric generator means comprise a generator directly driven by the thermal engine and supplying an alternating current to an electronic supply converter which supplies said DC supply current, and wherein the first adjusting device receives a first speed signal representative of the effective speed of the thermal engine, and delivers a first control signal to the adjusting element of the thermal engine and a second control signal to the supply converter.

10. A driving system according to claim 9, wherein the first adjusting device comprises:

a safety unit which receives the first set-point signal and delivers a corrected set-point signal as a function of an admissible power of the generator set, a signal generating unit arranged for receiving the corrected set-point signal and for delivering at least two intermediate signals representing two parameters which define an optimum state of the thermal engine, and an engine torque adjusting unit and a resistant torque adjusting unit which deliver respectively the first and the second control signal.

11. A driving system according to claim 10, wherein the first adjusting device comprises means for defining a transient variation in said first and second control signals.

12. A driving system according to claim 9, further comprising a mechanical transmission line between the thermal engine and said at least one driving wheel.

13. A driving system according to claim 3, further comprising a mechanical transmission line between the thermal engine and said at least one driving wheel.

14. A driving system according to claim 3, wherein the driving set is controlled by the second adjusting device as a slave of the generator set.

15. A driving system for a hybrid-powered motor vehicle, said system comprising a generator set comprising a thermal engine provided with a power adjusting element and electric generator means driven by the thermal engine to produce a DC supply current with adjustable power, a driving set supplied by said DC supply current and provided with at least one electric motor driving at least one driving wheel of the vehicle, an accelerator actuated by a driver of the vehicle to deliver a first set-point signal, and adjusting means arranged for adjusting the power of said at least one electric motor as a function of said first set-point signal, wherein the adjusting means comprise a first adjusting device, acting on the generator set to adjust the power of said DC supply current as a function of the first set-point signal, and a second adjusting device acting on the driving set to adjust the power of the electric motor as a function of a voltage of said DC supply current, the second adjusting device comprising a voltage sensor which delivers a measurement signal representative of said voltage, wherein the driving set comprises an electronic traction converter which receives said DC supply current and supplies said at least one electric motor, and the second adjusting device comprises an adjusting unit which receives the measurement signal and delivers a control signal to the traction converter as a function of the measurement signal, wherein said adjusting unit further receives a second set-point signal representative of a reference voltage and delivers said control signal as a function of a comparison between the measurement signal and the second set-point signal, and wherein the generator set comprises an electric accumulator and the adjusting means further comprises means for determining the second set-point signal as a function of a state of charge of said accumulator.

16. A driving system according to claim 15, further comprising a mechanical transmission line between the thermal engine and said at least one driving wheel.

17. A driving system for a hybrid-powered motor vehicle, said system comprising a generator set comprising a thermal engine provided with a power adjusting element and electric generator means driven by the thermal engine to produce a DC supply current with adjustable power, a driving set supplied by said DC supply current and provided with at least one electric motor driving at least one driving wheel of the vehicle, an accelerator actuated by a driver of the vehicle to deliver a first set-point signal, and adjusting means arranged for adjusting the power of said at least one electric motor as a function of said first set-point signal, wherein the adjusting means comprises a first adjusting device, acting on the generator set to adjust the power of said DC supply current as a function of the first set-point signal, and a second adjusting device acting on the driving set to adjust the power of the electric motor as a function of a parameter of said DC supply current, wherein the electric generator means comprises a generator directly driven by the thermal engine and supplying an alternating current to an electronic supply converter which supplies said DC supply current, and wherein the first adjusting device receives a first speed signal representative of the effective speed of the thermal engine, and delivers a first control signal to the adjusting element of the thermal engine and a second control signal to the supply converter, and wherein the first adjusting device comprises a safety unit which receives the first set-point signal and delivers a corrected set-point signal as a function of an admissible power of the generator set, a signal generating unit arranged for receiving the corrected set-point signal and for delivering at least two intermediate signals representing two parameters which define an optimum state of the thermal engine, and an engine torque adjusting unit and a resistant torque adjusting unit which deliver respectively the first and the second control signals.

18. A driving system according to claim 17, wherein the first adjusting device comprises means for defining a transient variation in said first and second control signals.

19. A driving system according to claim 17, wherein said parameter is a voltage, the second adjusting device comprising a voltage sensor which delivers a measurement signal representative of the voltage of said DC supply current.

20. A driving system according to claim 19, wherein the driving set comprises an electronic traction converter which receives said DC supply current and supplies said at least one electric motor, wherein the second adjusting device comprises an adjusting unit which receives the measurement signal and delivers a control signal to the traction converter as a function of the measurement signal, and wherein said adjusting unit further receives a second set-point signal representative of a reference voltage and delivers said control signal as a function of a comparison between the measurement signal and the second set-point signal.

21. A driving system according to claim 20, wherein the second set-point signal has a predetermined fixed value.

22. A driving system according to claim 20, wherein the generator set comprises an electric accumulator and wherein the adjusting means comprises means for determining the second set-point signal as a function of a state of charge of said accumulator.

23. A driving system according to claim 17, further comprising a mechanical transmission line between the thermal engine and said at least one driving wheel.

* * * * *